United States Patent
Morimoto et al.

(10) Patent No.: US 10,604,382 B2
(45) Date of Patent: Mar. 31, 2020

(54) WORK MACHINE WITH LIFTING MAGNET

(71) Applicant: SUMITOMO(S.H.I.) CONSTRUCTION MACHINERY CO., LTD., Tokyo (JP)

(72) Inventors: Takaaki Morimoto, Chiba (JP); Yoshimitsu Yuzawa, Chiba (JP); Hiroyuki Kurokawa, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 265 days.

(21) Appl. No.: 15/588,881

(22) Filed: May 8, 2017

(65) Prior Publication Data
US 2017/0240387 A1 Aug. 24, 2017

Related U.S. Application Data

(63) Continuation of application No. PCT/JP2015/081494, filed on Nov. 9, 2015.

(30) Foreign Application Priority Data

Nov. 10, 2014 (JP) .................................. 2014-228405

(51) Int. Cl.
*B66C 1/08* (2006.01)
*F02D 29/00* (2006.01)
(Continued)

(52) U.S. Cl.
CPC ............ *B66C 1/08* (2013.01); *B01D 53/9431* (2013.01); *E02F 9/2058* (2013.01); *F01N 3/2066* (2013.01); *F01N 9/00* (2013.01); *F01N 11/00* (2013.01); *F02D 29/00* (2013.01); *F02D 29/06* (2013.01); *F01N 2590/08* (2013.01); *F01N 2610/02* (2013.01); *F01N 2610/142* (2013.01);
(Continued)

(58) Field of Classification Search
CPC ..... B66C 1/08; B01D 53/9431; E02F 9/2058; F01N 3/2066; F01N 9/00; F01N 11/00; F01N 2590/08; F01N 2610/02; F01N 2610/1406; F01N 2610/142; F01N 2900/1814; F02D 29/00; F02D 29/06; F02D 2250/36; Y02T 10/24; Y02T 10/47
USPC ......................................................... 701/50
See application file for complete search history.

(56) References Cited

U.S. PATENT DOCUMENTS

| 3,795,334 A * | 3/1974 | Ishida ....................... B66C 1/08 294/65.5 |
| 2011/0264337 A1 | 10/2011 | Takanashi et al. |
| 2017/0121944 A1 * | 5/2017 | Kajita ................... E02F 9/2066 |

FOREIGN PATENT DOCUMENTS

| EP | 2022954 | 2/2009 |
| EP | 2 151 528 A1 * | 2/2010 ................ E02F 9/22 |

(Continued)

OTHER PUBLICATIONS

International Search Report for PCT/JP2015/081494 dated Jan. 26, 2016.

*Primary Examiner* — Paula L Schneider
(74) *Attorney, Agent, or Firm* — IPUSA, PLLC (57) ABSTRACT

A work machine provided with a lifting magnet includes the lifting magnet, an arm that supports the lifting magnet, a boom that supports the arm, an upper turning body that supports the boom, an engine, a selective catalytic reduction system, and a controller that controls attraction and release by the lifting magnet.

9 Claims, 5 Drawing Sheets

(51) Int. Cl.
  *F02D 29/06* (2006.01)
  *B01D 53/94* (2006.01)
  *E02F 9/20* (2006.01)
  *F01N 3/20* (2006.01)
  *F01N 9/00* (2006.01)
  *F01N 11/00* (2006.01)

(52) U.S. Cl.
  CPC ........... *F01N 2610/1406* (2013.01); *F01N 2900/1814* (2013.01); *F02D 2250/36* (2013.01); *Y02T 10/24* (2013.01); *Y02T 10/47* (2013.01)

(56) References Cited

FOREIGN PATENT DOCUMENTS

| | | |
|---|---|---|
| EP | 2151528 | 2/2010 |
| JP | 2006-025566 | 1/2006 |
| JP | 2006-219272 | 8/2006 |
| JP | 2007-045615 | 2/2007 |
| JP | 2007-050962 | 3/2007 |
| JP | 2007-076816 | 3/2007 |
| JP | 2008-128072 | 6/2008 |
| JP | 2010-155724 | 7/2010 |
| JP | 2013-160057 | 8/2013 |
| JP | 2013-160104 | 8/2013 |

* cited by examiner

WORK MACHINE WITH LIFTING MAGNET

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2015/081494 filed on Nov. 9, 2015, designating the U.S., which claims priority based on Japanese Patent Application No. 2014-228405 filed on Nov. 10, 2014. The entire contents of each of the foregoing applications are incorporated herein by reference.

BACKGROUND

Technical Field

The present invention relates to a work machine with a lifting magnet, which is for performing work using the lifting magnet.

Description of Related Art

As a work machine for transporting an object, such as a steel material, a work machine with a lifting magnet has been known. However, related art does not refer to suppression of a nitrogen oxide (NOx) content in an exhaust gas. Thus, the work machine with the lifting magnet according to related art may not sufficiently comply with an exhaust gas regulation.

There is a need for a work machine with a lifting magnet that is capable of suppressing the NOx (nitrogen oxide) content in the exhaust gas.

SUMMARY

According to an aspect of the present disclosure, there is provided a work machine provided with a lifting magnet. The work machine includes the lifting magnet, an arm that supports the lifting magnet, a boom that supports the arm, an upper turning body that supports the boom, an engine, a selective catalytic reduction system, and a controller that controls attraction and release by the lifting magnet.

DETAILED DESCRIPTION

Figure 1:
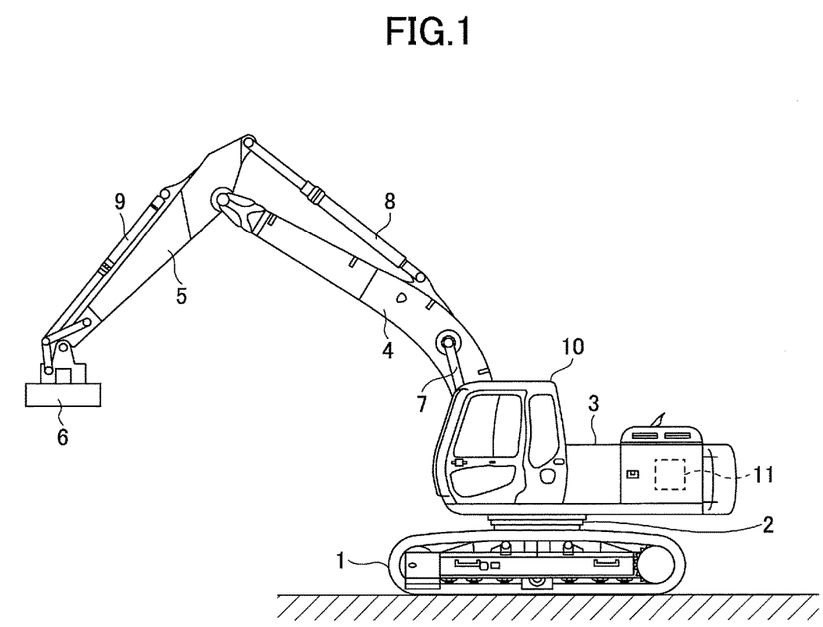
FIG. 1 is a side view of a work machine according to an embodiment of the present invention.

FIG. 1 is a side view of a work machine according to an embodiment of the present invention. On a lower traveling body 1 of the work machine, an upper turning body 3 is mounted through a turning mechanism 2. A boom 4 is attached to the upper turning body 3. An arm 5 is attached to a tip of the boom 4; and a lifting magnet 6 is attached to a tip of the arm 5. Namely, the lifting magnet 6 is supported by the arm 5; the arm 5 is supported by the boom 4; and the boom 4 is supported by the upper turning body 3. The boom 4, the arm 5, and the lifting magnet 6 are respectively hydraulically driven by a boom cylinder 7, an arm cylinder 8, and a lifting magnet cylinder 9. In the upper turning body 3, a cabin 10 is formed and a power source, such as an engine 11 that is an internal combustion engine, is installed.

Figure 2:
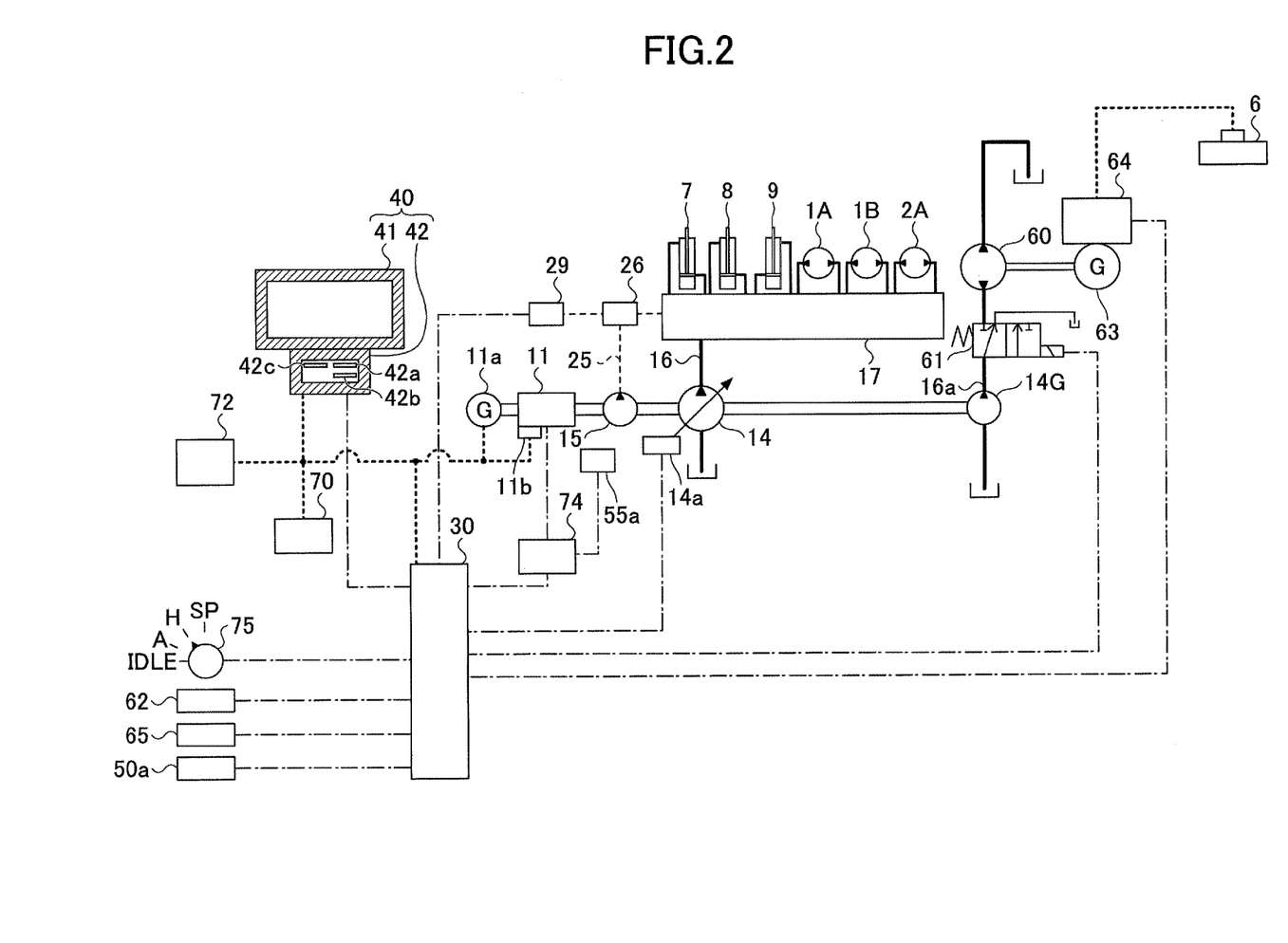
FIG. 2 is a block diagram illustrating an example of a configuration of a drive system of the work machine of FIG. 1.

FIG. 2 is a block diagram illustrating a configuration example of a drive system of the work machine shown in FIG. 1. In FIG. 2, a mechanical power system is indicated by a double line, a high-pressure hydraulic line is indicated by a thick solid line, a pilot line is indicated by a broken line, an electric control system is indicated by a one-dot chain line, and an electric drive system is indicated by a thick dotted line.

The drive system of FIG. 2 is mainly formed of an engine 11; an alternator 11a; a main pump 14; a hydraulic pump 14G for the lifting magnet; a pilot pump 15; a control valve 17; an operating device 26; a controller 30; and an engine control unit 74.

The engine 11 is a driving source of the work machine, and is, for example, a diesel engine that operates to maintain a predetermined revolution number. An output shaft of the engine 11 is connected to an input shaft of the alternator 11a, an input shaft of the main pump 14, an input shaft of the hydraulic pump 14G for the lifting magnet, and an input shaft of the pilot pump 15.

The main pump 14 is a hydraulic pump that supplies hydraulic oil to the control valve 17 through a high pressure hydraulic line 16, and is, for example, a swash plate type variable displacement hydraulic pump.

A regulator 14a is a device for controlling a discharge amount of the main pump 14. In this embodiment, the regulator 14a controls the discharge amount of the main pump 14 by adjusting a swash plate tilt angle of the main pump 14, depending on discharge pressure of the main pump 14, a control signal from the controller 30, etc.

The pilot pump 15 is a hydraulic pump for supplying, through a pilot line 25, hydraulic oil to various types of hydraulic control devices including the operating device 26, and is, for example, a fixed displacement type hydraulic pump.

The control valve 17 is a hydraulic control device for controlling the hydraulic system in the work machine. The control valve 17 selectively supplies the hydraulic oil discharged by the main pump 14 to one or more of the boom cylinder 7, the arm cylinder 8, the lifting magnet cylinder 9, a traveling hydraulic motor 1A (for right), a traveling hydraulic motor 1B (for left), and a turning hydraulic motor 2A, for example. In the following description, the boom cylinder 7, the arm cylinder 8, the lifting magnet cylinder 9, the traveling hydraulic motor 1A (for right), the traveling hydraulic motor 1B (for left), and the turning hydraulic motor 2A are collectively referred to as a "hydraulic actuator."

The operating device 26 is a device used by an operator to operate the hydraulic actuator. In the embodiment, the operating device 26 supplies the hydraulic oil from the pilot pump 15 to a pilot port of a corresponding flow amount control valve in the control valve 17 to generate pilot pressure. Specifically, the operating device 26 includes a turning operation lever; a boom operation lever, an arm operation lever, a lifting magnet operation lever, a traveling pedal, etc. The pilot pressure corresponds to operation details of the operating device 26 (which includes, for example, an operation direction and an operation amount).

A pressure sensor 29 detects the pilot pressure generated by the operating device 26. In the embodiment, the pressure sensor 29 detects the pilot pressure generated by the operating device 26, and outputs the detected value to the controller 30. The controller 30 finds operation details of the operating device 26 based on the output of the pressure sensor 29.

The controller 30 is a control device for controlling the work machine, and is formed of, for example, a computer including a CPU, a RAM, a ROM, etc. The controller 30 reads out, from the ROM, programs corresponding to operations or functions of the work machine to load them onto the RAM, and causes the CPU to execute processes corresponding to the programs.

The hydraulic pump 14G for the lifting magnet is a pump that supplies hydraulic oil to a hydraulic motor 60 for the lifting magnet through a high pressure hydraulic line 16a. In the embodiment, the hydraulic pump 14G for the lifting magnet is a fixed displacement type hydraulic pump, and supplies the hydraulic oil to the hydraulic motor 60 for the lifting magnet through a switching valve 61.

The switching valve 61 is a valve for switching a flow of hydraulic oil discharged by the hydraulic pump 14G for the lifting magnet. In the embodiment, the switching valve 61 is an electromagnetic valve that switches in response to a control command from the controller 30, and is provided with a first position at which the hydraulic pump 14G for the lifting magnet and the hydraulic motor 60 for the lifting magnet are communicated and a second position at which the hydraulic pump 14G for the lifting magnet and the hydraulic motor 60 for the lifting magnet are disconnected.

In response to detecting that a mode changing switch 62 is operated to switch an operation mode of the work machine to a lifting magnet mode, the controller 30 outputs a control signal to the switching valve 61, so that the switching valve 61 is switched to the first position. Upon detecting that the mode changing switch 62 is operated and the operation mode of the work machine is switched to a mode other than the lifting magnetic mode, the controller 30 outputs a control signal to the switching valve 61, so that the switching valve 61 is switched to the second position. FIG. 2 shows a state in which the switching valve 61 is at the second position. The mode changing switch 62 is a switch for changing the operation mode of the work machine. In the embodiment, it is a rocker switch installed in the cabin 10. An operator operates the mode changing switch 62 to alternatively switch between a shovel mode and the lifting magnet mode. The shovel mode is a mode for operating the work machine as a shovel, and is selected, for example, when a bucket is attached, instead of the lifting magnet 6. The lifting magnet mode is a mode for operating the work machine as the work machine with the lifting magnet, and is selected when the lifting magnet 6 is attached to the tip of the arm 5. The controller 30 may automatically switch the operation mode of the work machine based on outputs of various sensors.

During the lifting magnet mode, the switching valve 61 is set to the first position so as to cause the hydraulic oil discharged by the hydraulic pump 14G for the lifting magnet to flow into the hydraulic motor 60 for the lifting magnet. However, during a mode other than the lifting magnet mode, the switching valve 61 is set to the second position so as to cause the hydraulic oil discharged by the hydraulic pump 14G for the lifting magnet to flow out toward a hydraulic tank without causing the hydraulic oil to flow into the hydraulic motor 60 for the lifting magnet.

A rotational shaft of the hydraulic motor 60 for the lifting magnet is mechanically connected to a rotational shaft of an electric generator 63 for the lifting magnet. The electric generator 63 for the lifting magnet is a generator for generating electric power to magnetize the lifting magnet 6. In the embodiment, the electric generator 63 for the lifting magnet is an AC generator that operates in response to a control command from a power control device 64.

The power control device 64 is a device to control supplying and blocking of power for magnetizing the lifting magnet 6. In the embodiment, the power control device 64 controls start and stop of alternating-current power generation by the electric generator 63 for the lifting magnet in accordance with a power generation start command or a power generation stop command from the controller 30. The power control device 64 converts alternating-current power generated by the electric generator 63 for the lifting magnet into direct-current power, and supplies the direct-current power to the lifting magnet 6. The power control device 64 can control an absolute value of a direct-current voltage to be applied to the lifting magnet 6.

Upon detecting that a lifting magnet switch 65 is turned, so that it is in an ON state, the controller 30 outputs an attraction command to the power control device 64. Upon receiving the attraction command, the power control device 64 converts alternating-current power generated by the electric current generator 63 for the lifting magnet into direct-current power, and supplies the direct-current power to the lifting magnet 6, so that the lifting magnet 6 is magnetized. The magnetized lifting magnet 6 is in an attraction state in which the lifting magnet 6 can attract an object. At this time, the controller 30 sets an attraction flag with an initial value of "0" to "1." The attraction flag is a flag representing an attraction state of the lifting magnet 6. The value "0" represents a non-attraction state (release state), and the value "1" represents the attraction state. Release of the lifting magnet 6 means an operation in which supply of power to the lifting magnet 6 is stopped, so that electromagnetic force generated by the lifting magnet is eliminated.

Upon detecting that the lifting magnet switch 65 is turned-off, so that it is in an OFF state, the controller 30 outputs a release command to the power control device 64. Upon receiving the release command, the power control device 64 causes the power generation by the electric generator 63 for the lifting magnet to be stopped, so that the lifting magnet 6 in the attraction state is in the non-attraction state (the release state). At this time, the controller 30 sets the value of the attraction flag to "0."

The lifting magnet switch 65 is for switching between attraction and release of the lifting magnet 6. In the embodiment, the lifting magnet switch 65 is a push button switch provided at a top of at least one of left and right operation levers for operating the turning mechanism 2, the boom 4, the arm 6, and the lifting magnet 6. The lifting magnet switch 65 may be configured such that, each time the button is pushed, the ON state and the OFF state are alternately switched, or may be configured such that a button for the ON operation and a button for the OFF operation are separately prepared.

With this configuration, the work machine can perform work, such as attracting and conveying an object, by the lifting magnet 6, while operating the hydraulic actuator by hydraulic oil discharged by the main pump 14.

A fuel residual amount sensor 50a is an example of a fuel storage amount detector, and is for detecting a residual amount of fuel in a fuel tank as a fuel storage unit. In the embodiment, the fuel residual amount sensor 50a outputs information about the detected residual amount of the fuel to the controller 30. Specifically, the fuel residual amount sensor 50*a* is formed of a float that follows a variation of a liquid surface of the fuel inside the fuel tank; and a variable resistance (potentiometer) that converts vertical fluctuation of the float into a resistance value. With this configuration, the fuel residual amount sensor 50*a* can continuously detect a residual state of the fuel. A detection method of the fuel residual amount sensor 50*a* may be appropriately selected depending on a usage environment, and a detection method may be adopted that can stepwise detect the residual state of the fuel.

A urea water residual amount sensor 55*a* is an example of a reducing agent storage unit, and is for detecting a residual amount of urea water in the urea water tank 55 as a reducing agent storage unit. In the embodiment, the urea water residual amount sensor 55*a* outputs information about the detected residual amount of the urea water to the engine control unit 74. The engine control unit 74 outputs the information about the residual amount of the urea water received from the urea water residual amount sensor 55*a* to the controller 30. Specifically, the urea water residual amount sensor 55*a* is formed of a float in which a magnet is fixed; and a plurality of magnetically driven reed switches installed at respective different heights. The urea water residual amount sensor 55*a* detects a residual amount state of the urea water using that a reed switch corresponding to a position of the float that follows variation of a liquid surface of the urea water inside the urea water tank 55 becomes a conductive state. More specifically, the urea water residual amount sensor 55*a* is provided with eight reed switches arranged at equal intervals. With this configuration, the urea water residual amount sensor 55*a* can detect the residual amount state of the urea water in eight steps. A detection method of the urea water residual amount sensor 55*a* can be appropriately selected depending on a usage environment, a freezing point of the urea water, etc., and a detection method may be adopted that can continuously detect the residual amount state of the urea water.

An image display device 40 is a device for displaying various types of information. In the embodiment, the image display device 40 is fixed to a pillar of the cabin 10, in which a driver's seat is formed. As illustrated in FIG. 2, the image display device 40 can display an operating condition and control information of the work machine on an image display unit 41 to provide the information to a driver. The image display device 40 includes a switch panel 42 as an input unit. A driver can input information and a command to the controller 30 of the work machine using the switch panel 42.

The switch panel 42 is a panel including various types of hardware switches. In the embodiment, the switch panel 42 includes a light switch 42*a*; a wiper switch 42*b*; and a window washer switch 42*c*, as hardware buttons. The light switch 42*a* is for switching between turning on and off of a light attached to an outer part of the cabin 10. The wiper switch 42*b* is for switching between turning on and off of a wiper. The window washer switch 42*c* is a switch for injecting a window washer liquid.

The image display device 40 operates by receiving supply of electric power from a storage battery 70. The storage battery 70 is charged with electric power that is generated by the alternator 11*a*. The electric power of the storage battery 70 is also supplied to an electrical component 72 of the work machine other than the controller 30 and the image display device 40. A starter 11*b* of the engine 11 is driven by electric power from the storage battery 70 to start the engine 11.

The engine control unit 74 is a device for controlling the engine 11. In the embodiment, the engine control unit 74 collects various types of data indicating a state of the engine 11, and transmits the collected data to the controller 30. In the embodiment, the engine control unit 74 and the controller 30 are famed as separate bodies; however, they may be integrally formed. For example, the engine control unit 74 may be integrated into the controller 30.

An engine revolution number adjusting dial 75 is a dial for adjusting an engine revolution number. In the embodiment, the engine revolution number adjusting dial 75 is installed inside the cabin 10, so that the engine revolution number can be switched in four steps. The engine revolution number adjusting dial 75 outputs data indicating a setting condition of the engine revolution number to the controller 30. The engine revolution number adjusting dial 75 allows the engine revolution number to be switched in the four steps, which are a SP mode, a H mode, an A mode, and an idling mode. FIG. 2 shows a state in which the H mode is selected by the engine revolution number adjusting dial 75.

The SP mode is a revolution number mode to be selected when volume of work is to be prioritized, and uses the largest revolution number. The H mode is a revolution number mode to be selected when volume of work and fuel consumption are to be balanced, and uses the second largest revolution number. The A-mode is a revolution number mode to be selected when it is desired to operate the work machine with low noise while prioritizing fuel consumption, and uses the third largest revolution number. The idling mode is a revolution number mode to be selected when the engine is to be in an idling mode, and uses the smallest engine revolution number (idling revolution number). The revolution number of the engine 11 is controlled to be a constant engine revolution number of the revolution number mode that is selected by the engine revolution number adjusting dial 75.

Figure 3:
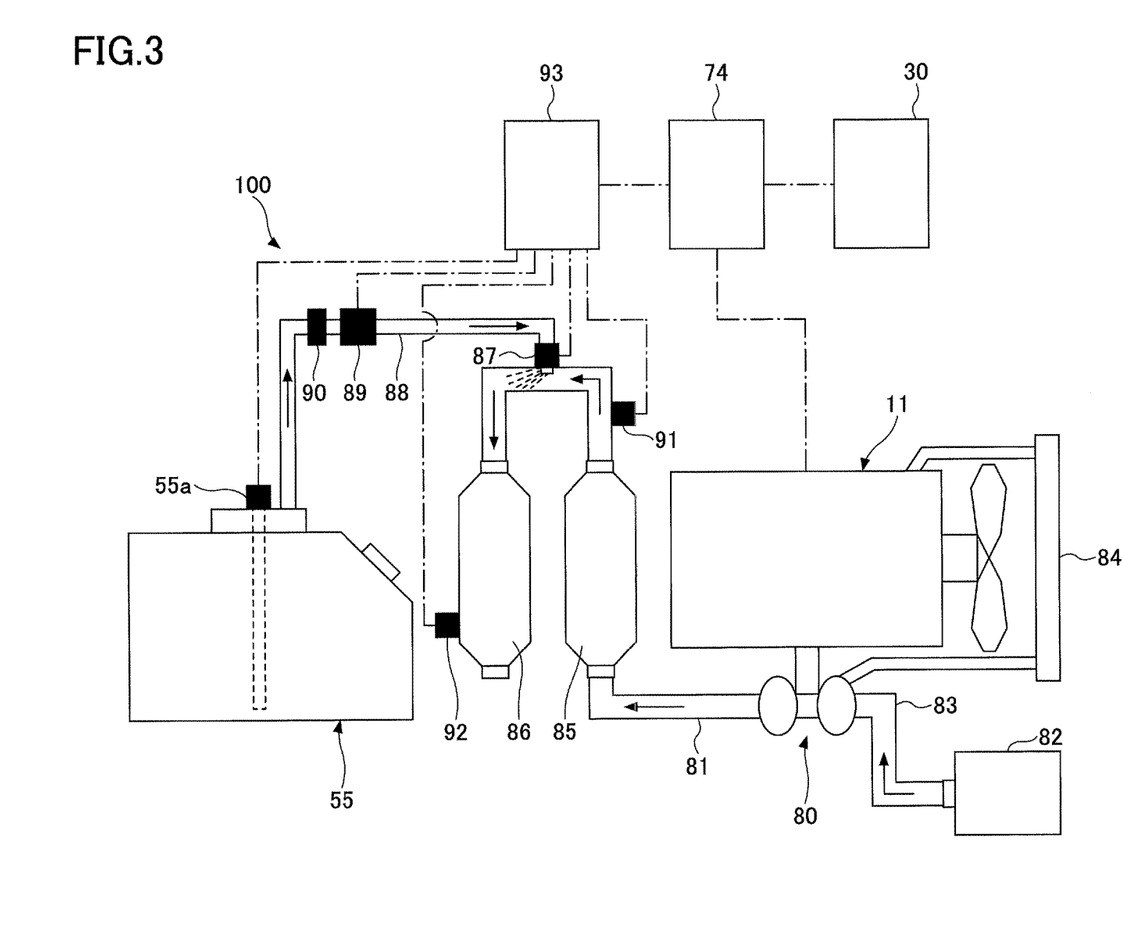
FIG. 3 is a schematic diagram illustrating an example of a configuration of a selective catalytic reduction system mounted on the work machine of FIG. 1.

Next, referring to FIG. 3, a selective reducing catalyst system 100 is described, which is to be installed in the work machine of FIG. 1. Note that FIG. 3 is a schematic diagram illustrating an example of a configuration of the selective reducing catalyst system 100. The selective reducing catalyst system 100 is an example of an exhaust gas purifying system, and purifies the exhaust gas emitted from the engine 11.

Fuel is supplied to the engine 11 from the fuel tank by a high pressure pump. This high pressure fuel is directly injected into a combustion chamber, and the high pressure fuel burns. The engine 11, the high pressure pump, and so forth are controlled by the engine control unit 74.

The exhaust gas from the engine 11 passes through a turbocharger 80, and then flows into a downstream exhaust pipe 81. After a purifying process by the selective reducing catalyst system 100 is applied, the exhaust gas is discharged into the atmosphere.

The intake air drawn from an air cleaner 82 into an air inlet pipe 83 passes through the turbocharger 80 and an intercooler 84 to be supplied to the engine 11.

In the exhaust pipe 81, a diesel particulate filter 85 that collects particulates in the exhaust gas and a selective reducing catalyst 86 for reducing and removing NOx in the exhaust gas are serially arranged.

The selective reducing catalyst 86 receives supply of a liquid reducing agent (e.g., urea or ammonia) and continuously reduces and removes NOx in the exhaust gas. In the embodiment, from the view point of ease of handling, urea water (aqueous urea solution) is used as the liquid reducing agent.

At an upstream side of the selective reducing catalyst 86, a urea water injection device 87 is provided, which is for supplying the urea water to the selective reducing catalyst 86. The urea water injection device 87 is connected to the urea water tank 55 through a urea water supply line 88.

Furthermore, in the urea water supply line 88, a urea water supply pump 89 is provided, and a filter 90 is provided between the urea water tank 55 and the urea water supply pump 89. The urea water stored in the urea water tank 55 is supplied to the urea water injection device 87 by the urea water supply pump 89, and is injected from the urea water injection device 87 to an upstream position of the selective reducing catalyst 86 in the exhaust pipe 81.

The urea water injected from the urea water injection device 87 is supplied to the selective reducing catalyst 86. The supplied urea water is hydrolyzed in the selective reducing catalyst 86 to produce ammonia. This ammonia reduces the NOx included in the exhaust gas in the selective reducing catalyst 86, and by this reduction reaction of the NOx, the exhaust gas is purified.

A first NOx sensor 91 is disposed at an upstream side of the urea water injection device 87. Furthermore, a second NOx sensor 92 is disposed at a downstream side of the selective reducing catalyst 86. The NOx sensors 91 and 92 detect NOx concentration in the exhaust gas at respective disposed positions.

In the urea water tank 55, the urea water residual amount sensor 55a is disposed. The urea water residual amount sensor 55a detects a urea water residual amount in the urea water tank 55.

The NOx sensors 91 and 92, the urea water residual amount sensor 55a, the urea water injection device 87, and the urea water supply pump 89 are connected to a selective reducing catalyst system controller 93. Based on the NOx concentration detected by the NOx sensors 91 and 92, the selective reducing catalyst system controller 93 controls an injection amount, so that an appropriate amount of urea water is injected into the exhaust pipe 81 by the urea water injection device 87 and the urea water supply pump 89.

Based on the urea water residual amount output from the urea water residual amount sensor 55a, the selective reducing catalyst system controller 93 calculates a ratio of the urea water residual amount with respect to the total volume of the urea water tank 55 (which is referred to as a "urea water residual amount ratio," hereinafter). For example, the urea water residual amount ratio of 50% indicates that the urea water corresponding to a half of the volume of the urea water tank 55 remains in the urea water tank 55.

The selective reducing catalyst system controller 93 is connected to the engine control unit 74 by a communication unit. Furthermore, the engine control unit 74 is connected to the controller 30 by a communication unit. Note that, in the embodiment, the selective reducing catalyst system controller 93, the engine control unit 74, and the controller 30 are formed as separate bodies; however, at least two of them may be integrally famed. For example, the selective reducing catalyst system controller 93 may be integrated in the engine control unit 74.

It is configured such that various types of information about the selective reducing catalyst system 100 owned by the selective reducing catalyst system controller 93 can be shared by the controller 30 and the engine control unit 74. Similar to the controller 30, each of the engine control unit 74 and the selective reducing catalyst system controller 93 includes a CPU, a RAM, a ROM, an input/output port, a storage device, etc. The engine control unit 74 determines an injection amount of the urea water depending on the collected data. Then, the engine control unit 74 transmits a control signal to the urea water injection device 87 through the selective reducing catalyst system controller 93 to control the injection amount of the urea water to the exhaust gas from the engine 11.

Figure 4:
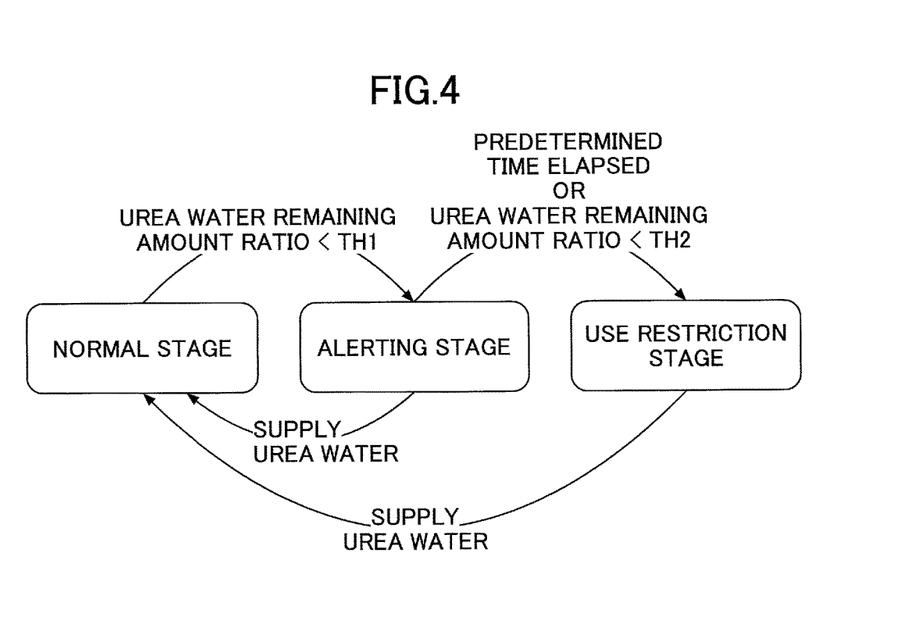
FIG. 4 is a state transition diagram of the work machine of FIG. 1.

Next, referring to FIG. 4, an operation state of the work machine of FIG. 1 is described, which transitions in response to a decrease in the urea water amount. Here, FIG. 4 is a state transition diagram of the work machine of FIG. 1.

As illustrated in FIG. 4, the operation state of the work machine of FIG. 1 transitions in three stages, which are a normal stage, an alerting stage, and a use restriction stage, depending on the decrease in the urea water residual amount.

In the normal stage, the work machine operates without receiving any restriction on the urea water residual amount. Then, upon detecting that the urea water residual amount becomes less than a predetermined amount, the operation state of the work machine transitions from the normal stage to the alerting stage. In the embodiment, upon detecting that the urea water residual amount ratio becomes less than the predetermined value TH1 (e.g., 5%), the operation state of the work machine transitions from the normal stage to the alerting stage. It is preferable that the predetermined value TH1 be set within a range from 3% to 10%.

At the alerting stage, the work machine operates while receiving a predetermined restriction on the urea water residual amount. In the embodiment, the controller 30 causes the image display device 40 to display a text message indicating that the urea water residual amount ratio becomes less than the predetermined threshold value TH1. Furthermore, even if the lifting magnet switch 65 is turned on in the lifting magnet mode, the controller 30 does not allow the lifting magnet 6 to be magnetized. The reason is to prevent the lifting magnet 6 from being forcibly released when the engine revolution number has to be reduced due to the shortage of the urea water in the subsequent work. However, upon detecting that the lifting magnet 6 has already been in the attraction state at the time of the transition from the normal stage to the alerting stage, the controller 30 allows the magnetization of the lifting magnet 6 to be continued without releasing the lifting magnet 6. The reason is to prevent an object attracted by the lifting magnet 6 from being dropped. In this case, the controller 30 may cause the image display device 40 to display a text message prompting release of the lifting magnet 6. Note that, even if the magnetization of the lifting magnet 6 is continued at the time of the transition from the normal stage to the alerting stage, if the lifting magnet 6 is released after that, the controller 30 does not allow the lifting magnet 6 to be magnetized, even if the lifting magnet switch 65 is turned on in the lifting magnet mode.

Then, upon detecting that the duration of the alerting stage becomes greater than or equal to a predetermined time period, or that the urea water residual amount ratio becomes another predetermined value TH2 (e.g., 0%), the operation state of the work machine transitions from the alerting stage to the use restriction stage. Here, it is preferable that the predetermined value TH2 be set within a range from 0% to 1%. Furthermore, when the urea water is supplied, the operation state of the work machine transitions from the alerting stage to the normal stage.

At the use restriction stage, the work machine operates while receiving a predetermined additional restriction on the urea water residual amount. In the embodiment, the controller 30 causes the image display device 40 to display a text message indicating that the urea water residual amount ratio becomes the predetermined value TH2. Furthermore, the engine control unit 74 reduces the engine revolution number to be a predetermined revolution number. The predetermined revolution number may be a minimum revolution number at which the attraction force of the lifting magnet 6 can be maintained, or an idling revolution number. In this case, the controller 30 may cause the image display device 40 to display a text message indicating that the engine revolution number has been reduced.

However, upon detecting that the lifting magnet 6 has already been in the attraction state at the time of the transition from the alerting stage to the use restriction stage, the controller 30 allows the engine 11 to continue driving at the current engine revolution number without reducing the engine revolution number. The reason is to prevent the lifting magnet 6 from being forcibly released, and to prevent an object that has been attracted by the lifting magnet 6 from being dropped.

Specifically, the engine control unit 74 causes the engine revolution number to be decreased to a predetermined revolution number; however, even after the engine revolution number is reduced to the predetermined revolution number, the engine revolution number is allowed to be adjusted toward the increasing side, only for a predetermined number of times (e.g., once). In the following, the function of the controller 30 to increase the engine revolution number after the engine control unit 74 reduces the engine revolution number to the predetermined revolution number is referred to as the "escape function." Additionally, an operation mode of the work machine after the controller 30 has increased the engine revolution number using this escape function is referred to as the "escape mode." The engine control unit 74 may limit the time to allow the engine revolution number to be adjusted toward the increasing side. Upon detecting that the urea water residual ratio becomes 0%, the engine control unit 74 may disallow execution of the escape function.

The controller 30 uses this escape function to cause the engine revolution number to be increased, immediately after the engine revolution number has been decreased to the predetermined revolution number. For example, the controller 30 causes the engine revolution number to be automatically returned to the original revolution number, or causes the engine revolution number to be automatically increased to a revolution number at which the attraction force of the lifting magnet 6 can be maintained. Then, the reduction in the engine revolution number, which has been caused by the engine control unit 74 for preventing an increase in NOx in the exhaust gas due to the shortage of the urea water, is disabled. In this case, the controller 30 may cause the image display device 40 to display a text message prompting an early release of the lifting magnet 6. Note that the revolution number at which the attraction force of the lifting magnet 6 can be maintained is a value that is derived from a specification value of the lifting magnet 6, and, in the embodiment, it is stored in advance in the ROM, etc.

Furthermore, even if the reduction in the engine revolution number is disabled at the time of the transition from the alerting stage to the use restriction stage to continue the lifting magnet 6 to be magnetized, if, after that, the lifting magnet 6 is released, the controller 30, then, causes the engine revolution number to be decreased. Furthermore, even if the lifting magnet switch 65 is turned on in the lifting magnet mode, the lifting magnet 6 is not to be magnetized. When the urea water is supplied, the operating state of the work machine transitions from the use restriction stage to the normal stage.

Figure 5:
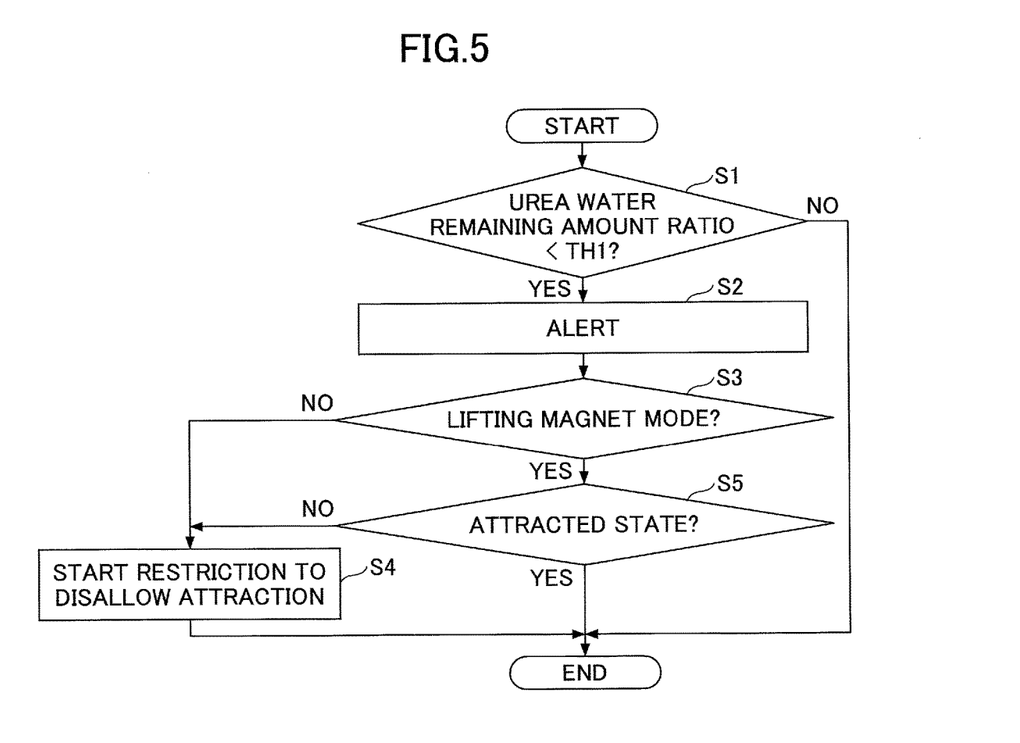
FIG. 5 is a flowchart illustrating a flow of a process of transitioning to an alerting stage.

Next, referring to FIG. 5, a process at the time of the transition from the normal stage to the alerting stage (which is referred to as the "alerting stage transition process," hereinafter) is described. Note that FIG. 5 is a flowchart illustrating a flow of the alerting stage transition process. The controller 30 repeatedly executes the alerting stage transition process at a predetermined control cycle.

First, the controller 30 determines whether the urea water residual amount ratio becomes less than the predetermined value TH1 (step S1). In the embodiment, the controller 30 compares the urea water residual amount ratio calculated by the selective reducing catalyst system controller 93 based on the output of the urea water residual amount sensor 55*a* with the predetermined value TH1 (e.g., 5%), which is set in the ROM, etc., in advance.

In response to determining that the urea water residual amount ratio is greater than or equal to the predetermined value TH1 (NO at step S1), the controller 30 terminates the alerting stage transition process for this time, without disallowing the lifting magnet 6 to be magnetized.

In response to determining that the urea water residual amount ratio is less than the predetermined value TH1 (YES at S1), the controller 30 calls attention of a driver of the work machine (step S2). In the embodiment, the controller 30 outputs a control command to the image display device 40 so as to cause the image display unit 41 to display a text message indicating that the urea water residual amount ratio becomes less than the predetermined value TH1. Then, the driver of the work machine is prompted to supply the urea water. In addition to or instead of causing the image display unit 41 to display the text message, the controller 30 may cause a vehicle-mounted speaker, etc., to output a voice message, may cause a remaining amount warning lamp, etc., to be turned on, or may cause a warning buzzer, etc., to make a sound.

After that, the controller 30 determines whether the operation mode of the work machine is the lifting magnet mode (step S3). In the embodiment, the controller 30 determines whether the operation mode of the working machine is the lifting magnet mode of the shovel mode, based on the output of the mode changing switch 62.

In response to determining that the operation mode of the work machine is not the lifting magnet mode (NO at step S3), the controller 30 starts a restriction to disallow attraction (step S4).

The restriction to disallow the attraction is a function to disallow the lifting magnet 6 to be magnetized (attraction of an object by the lifting magnet 6). In the embodiment, when the restriction to disallow the attraction is started, the controller 30 does not allow the lifting magnet 6 to be magnetized, even if the lifting magnet switch 65 is turned on. When the restriction to disallow the attraction is started once, the controller 30 does not release the restriction to disallow the attraction until the urea water is supplied.

Specifically, when the restriction to disallow the attraction is started, the controller 30 sets a value of an attraction disallow flag, which has an initial value of "0," to "1." The attraction disallow flag is a flag representing whether the restriction to disallow the attraction is started, the value "0" represents a non-started state (a state in which the restriction to disallow the attraction is not started), and the value "1" represents a started state (a state in which the restriction to disallow the attraction is started). Then, when a power generation start command is to be output to the power control device 64, the controller 30 refers to the value of the attraction disallow flag. If the value is "0," the power generation start command is to be output. If the value is "1," the power generation start command is not to be output.

Furthermore, in response to determining that the operation mode of the work machine is the lifting magnet mode (YES at step S3), the controller 30 determines whether the lifting magnet 6 is in the attraction state (step S5).

In response to determining that the lifting magnet 6 is not in the attraction state (NO at step S5), the controller 30 starts the restriction to disallow the attraction (step S4). In the embodiment, in response to determining that the lifting magnet 6 is not in the attraction state, namely, it is in the non-attraction state, based on the output of the lifting magnet switch 65 (NO at step S5), the controller 30 starts the restriction to disallow the attraction. Then, even if the lifting magnet switch 65 is turned on, the lifting magnet 6 is not to be magnetized. The reason is to prevent the lifting magnet 6 from being forcibly released when the engine revolution number has to be reduced due to the shortage of the urea water in the subsequent work. In the following, the operation mode of the work machine in this state is referred to as the "lifting magnet release mode."

In contrast, upon determining that the lifting magnet 6 is in the attraction state (YES at step S5), the controller 30 terminates the alerting stage transition process for this time, without starting the restriction to disallow the attraction. The reason is to prevent an attracted object from being dropped. In the following, the operation mode of the work machine in this state is referred to as the "attraction drop prevention mode."

Furthermore, when the lifting magnet 6 is released in the attraction drop prevention mode, the controller 30 determines that the lifting magnet 6 is not in the attraction state, and starts the restriction to disallow the attraction at that time point so as to cause the operation mode of the work machine to transition to the lifting magnet release mode.

As described above, the controller 30 causes the control state of the lifting magnet 6 to be changed depending on the state of the urea water tank 55 (e.g., the urea water residual amount) used in the selective reducing catalyst system 100.

With the above-described configuration, the work machine of FIG. 1 reduces and removes NOx in the exhaust gas using the selective reducing catalyst 86. Consequently, the content of NOx (nitrogen oxide) in the exhaust gas can be suppressed.

Even if the restriction to disallow the attraction is to be started due to the shortage of the urea water, if the lifting magnet 6 is attracting an object, the controller 30 causes the restriction to disallow the attraction not to be started. Consequently, the controller 30 can prevent the magnetic force of the lifting magnet 6 from being reduced or lost, due to lowering of the output of the electric generator 63 for the lifting magnet by starting of the restriction to disallow the attraction caused by the shortage of the urea water, so that the controller 30 can prevent an object attracted by the lifting magnet 6 from being dropped.

Figure 6:
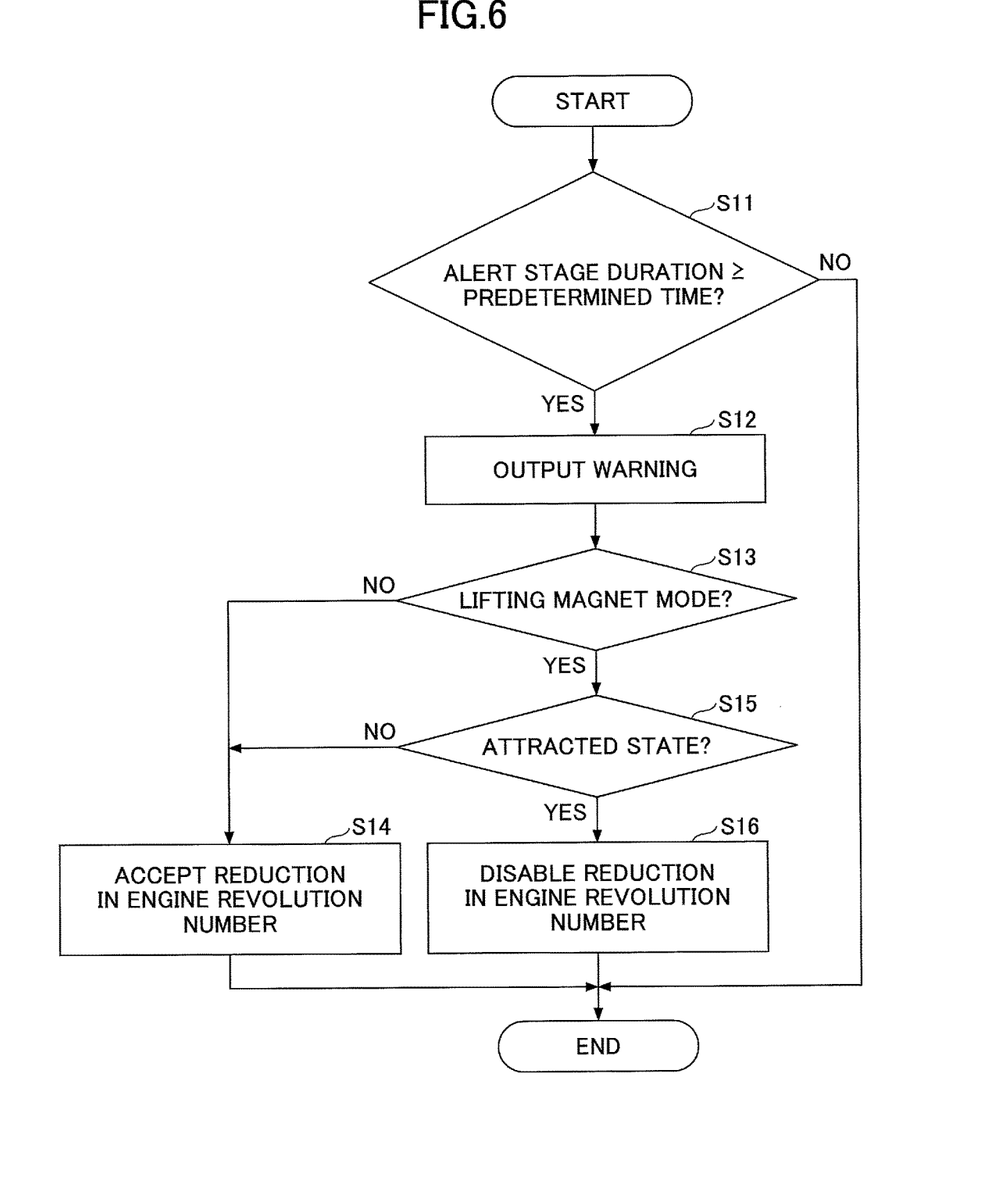
FIG. 6 is a flowchart illustrating a flow of a process of transitioning to a use restriction stage.

Next, referring to FIG. 6, a process at the time of the transition from the alerting stage to the use restriction stage (which is referred to as the "use restriction stage transition process," hereinafter) is described. Here, FIG. 6 is a flowchart illustrating a flow of the use restriction stage transition process. The controller 30 repeatedly executes the use restriction stage transition process at a predetermined control cycle.

First, the controller 30 determines whether the duration of the alerting step becomes greater than or equal to a predetermined time interval (step S11). Note that the controller 30 may determine whether the urea water residual amount ratio becomes the predetermined value TH2, instead of determining whether the duration of the alerting step becomes greater than or equal to the predetermined time interval.

In response to determining that the duration of the alerting step is less than the predetermined time interval (NO at step S11), the controller 30 terminates the use restriction stage transition process for this time, without causing the engine revolution number to be reduced.

In response to determining that the duration of the alerting step becomes greater than or equal to the predetermined time interval (YES at step S11), the controller 30 outputs a warning (step S12). In the embodiment, the controller 30 outputs a control command to the image display device 40 so as to cause the image display unit 41 to display a text message indicating that the urea water residual amount is almost running out. Then, the driver of the work machine is prompted to supply the urea water early. In addition to or instead of causing the image display unit 41 to display the text message, the controller 30 may cause a vehicle-mounted speaker, etc., to output a voice message.

After that, the controller 30 determines whether the operation mode of the work machine is the lifting magnet mode (step S13). In the embodiment, the controller 30 determines whether the operation mode of the work machine is the lifting magnet mode or the shovel mode, based on the output of the mode changing switch 62.

In response to determining that the operation mode of the work machine is not the lifting magnet mode (NO at step S13), the controller 30 accepts reduction of the engine revolution number caused by the engine control unit 74 (step S14). Specifically, when the duration of the alerting step exceeds the predetermined time interval, the engine control unit 74 forcibly reduces the engine revolution number irrespective of the control by the controller 30. The controller 30 does not perform any processing on the reduction of the engine revolution number caused by the engine control unit 74. Furthermore, when the engine revolution number is reduced once, the engine control unit 74 disallows the engine revolution number to be increased until the urea water is supplied.

In response to detecting that the operation mode of the work machine is the lifting magnet mode (YES at step S13), the controller 30 determines whether the lifting magnet 6 is in the attraction state (step S15).

Then, upon detecting that the lifting magnet 6 is not in the attraction state (NO at step S15), the controller 30 accepts the reduction of the engine revolution number caused by the engine control unit 74 (step S14). In the embodiment, upon determining that the lifting magnet 6 is not in the attraction state, namely, it is in the non-attraction state, based on the output of the lifting magnet switch 65 (NO at step S15), the controller 30 accepts the reduction of the engine revolution number caused by the engine control unit 74. In the following, the operation mode of the work machine in this state is referred to as the "use restriction mode." The reason is that, due to the reduction of the engine revolution number, the absorption horsepower that can be consumed by the main pump 14 is limited. In the use restriction mode, even if the lifting magnet switch 65 is turned on, the controller 30 does not allow the lifting magnet 6 to be magnetized. The reason is to prevent the lifting magnet 6 from being forcibly released when the engine revolution number has to be reduced due to the shortage of the urea water in the subsequent work, and to prevent an object attracted by the lifting magnet 6 from being dropped.

Upon determining that the lifting magnet 6 is in the attraction state (YES at S15), the controller 30 disables the reduction of the engine revolution number caused by the engine control unit 74 (step S16). The reason is to prevent an attracted object from being dropped.

Specifically, the controller 30 causes the engine revolution number to be returned to the original revolution number immediately after the engine revolution number is reduced to be the predetermined revolution number by the engine control unit 74 so as to disable the reduction of the engine revolution number caused by the engine control unit 74. At this time, the operation mode of the work machine is the "escape mode."

When the lifting magnet 6 is released in the escape mode, the controller 30 determines that the lifting magnet 6 is not in the attraction state, and causes, at that time point, the operation mode of the work machine to transition from the escape mode to the use restriction mode. As a result, the engine control unit 74 reduces the engine revolution number to be the predetermined revolution number. The reason is to suppress the emission amount of NOx, and to disallow the operation of the work machine to continue.

As described above, the controller 30 causes the control state of the lifting magnet 6 to be changed depending on the state of the urea water tank 55 (e.g., the duration of the state in which the residual amount of the urea water is less than the predetermined value TH1) used in the selective reducing catalyst system 100.

With the above-described configuration, the work machine of FIG. 1 reduces and removes NOx in the exhaust gas using the selective reducing catalyst 86. Consequently, the emission amount of NOx (nitrogen oxide) included in the exhaust gas can be reduced.

Furthermore, even if the engine control unit 74 executes, due to the shortage of the urea water, the output restriction of the engine 11 (the reduction of the engine revolution number), if the lifting magnet 6 is attracting an object, the controller 30 disables the reduction of the engine revolution number. Consequently, the controller 30 can prevent the magnetic force of the lifting magnet 6 from being reduced or lost, due to lowering of the output of the electric generator 63 for the lifting magnet by the reduction of the engine revolution number caused by the shortage of the urea water, so that the controller 30 can prevent an object attracted by the lifting magnet 6 from being dropped.

Furthermore, the controller 30 preferentially disables the reduction of the engine revolution number over monitoring of the urea water residual amount by the selective reducing catalyst system controller 93 and the output restriction of the engine 11 by the engine control unit 74. Consequently, even if the selective reducing catalyst system controller 93 and the engine control unit 74 execute their original functions, it can be prevented that, when the lifting magnet 6 is attracting an object, the output of the electric generator 63 for the lifting magnet is lowered and the magnetic force of the lifting magnet 6 is reduced or lost.

The preferred embodiment of the present invention is described above. However, the present invention is not limited to the above-described embodiment, and various modifications and substitutions may be added to the above-described embodiment without departing from the scope of the present invention.

For example, in the above-described embodiment, upon detecting that the urea water residual amount ratio becomes less than the predetermined value TH1, the controller 30 determines whether the restriction to disallow the attraction is to be started; or upon detecting that the duration of the alerting stage is greater than or equal to the predetermined time interval, the controller 30 determines whether the reduction of the engine revolution number is to be disabled. However, the present invention is not limited to this configuration. For example, the controller 30 may detect quality of the urea water based on outputs of various sensors; and, upon detecting an abnormality in the quality of the urea water, the controller 30 may determine whether the restriction to disallow the attraction is to be started. Similarly, upon detecting an abnormality in the quality of the urea water, the controller 30 may determine whether the reduction of the engine revolution number is to be disabled.

What is claimed is:

1. A work machine provided with a lifting magnet, the work machine comprising:
    the lifting magnet;
    an arm that supports the lifting magnet;
    a boom that supports the arm;
    an upper turning body that supports the boom;
    an engine;
    a selective catalytic reduction system; and
    a controller that controls attraction and release by the lifting magnet,
    wherein the controller controls the lifting magnet depending on a state of a residual amount of urea water used in the selective catalytic reduction system and the attraction and release by the lifting magnet.

2. The work machine provided with the lifting magnet according to claim 1, wherein, after the residual amount of the urea water used in the selective catalytic reduction system becomes less than a predetermined amount, upon determining that the lifting magnet is in an attraction state, the controller causes the attraction state of the lifting magnet to be continued.

3. The work machine provided with the lifting magnet according to claim 1, wherein, after the residual amount of the urea water used in the selective catalytic reduction system becomes less than a predetermined amount, upon determining that the lifting magnet is in a release state, the controller disallows the lifting magnet to be magnetized.

4. The work machine provided with the lifting magnet according to claim 1, wherein, after the residual amount of the urea water used in the selective catalytic reduction system becomes less than a predetermined amount, the controller causes a revolution number of the engine to be a revolution number at which attraction force of the lifting magnet is maintained.

5. The work machine provided with the lifting magnet according to claim 1, wherein, after the residual amount of the urea water used in the selective catalytic reduction system becomes less than a predetermined amount, upon determining that the lifting magnet is in an attraction state, the controller causes the attraction state of the lifting magnet to be continued, and then, upon determining that the lifting magnet is in a release state, the controller causes a revolution number of the engine to be an idling revolution number.

6. The work machine provided with the lifting magnet according to claim 1, wherein, upon determining that the residual amount of the urea water used in the selective catalytic reduction system becomes less than a predetermined amount and that the lifting magnet is in a release state, the controller disallows the lifting magnet to be magnetized.

7. The work machine provided with the lifting magnet according to claim 1, wherein the controller controls the lifting magnet depending on whether, upon detecting that the residual amount of the urea water used in the selective catalytic reduction system becomes less than a predetermined amount, the lifting magnet is in an attraction state or in a release state.

8. The work machine provided with the lifting magnet according to claim 1, wherein the controller controls a revolution number of the engine depending on a state of the residual amount of the urea water used in the selective catalytic reduction system.

9. The work machine provided with the lifting magnet according to claim 1, wherein the controller controls a revolution number of the engine depending on whether, upon detecting that the residual amount of the urea water used in the selective catalytic reduction system becomes less than a predetermined amount, the lifting magnet is in an attraction state or in a release state.

* * * * *